United States Patent [19]

McDonald

[11] 4,147,318
[45] Apr. 3, 1979

[54] ENGINE CASING SUPPORT BRACKET

[75] Inventor: Angus McDonald, Johannesburg, South Africa

[73] Assignee: Alan Morris Buten, Johannesburg, South Africa

[21] Appl. No.: 780,338

[22] Filed: Mar. 23, 1977

[30] Foreign Application Priority Data

Apr. 7, 1976 [ZA] South Africa ............. 76/2094

[51] Int. Cl.² ................................................ B60K 1/00
[52] U.S. Cl. .................................. 180/64 R; 248/503; 248/672
[58] Field of Search ............... 180/64 R; 248/2–10, 248/14, 300

[56] References Cited

U.S. PATENT DOCUMENTS

| 1,052,151 | 2/1913 | King | 248/3 X |
| 1,056,253 | 3/1913 | Brooks | 248/3 X |
| 1,145,070 | 7/1915 | Knecht | 248/3 X |
| 1,502,943 | 7/1924 | Dunn | 180/64 R |
| 1,510,047 | 9/1924 | Dunn | 180/64 R |
| 1,652,159 | 12/1927 | Baker | 180/64 R |
| 1,811,961 | 6/1931 | Partin | 248/8 |

FOREIGN PATENT DOCUMENTS

| 626137 | 2/1936 | Fed. Rep. of Germany | 248/2 |
| 2359591 | 6/1975 | Fed. Rep. of Germany | 248/2 |
| 1101136 | 4/1955 | France | 180/64 R |

Primary Examiner—Lawrence J. Staab
Attorney, Agent, or Firm—Oblon, Fisher, Spivak, McClelland & Maier

[57] ABSTRACT

A bracket for supporting an internal combustion engine on a motor vehicle chassis, wherein an engine for one kind of vehicle can easily be mounted on the chassis of a different kind of motor vehicle. The bracket is characterized by an arm and two wings and is designed for central mounting underneath the engine block in a manner providing stable location of engine and chassis.

11 Claims, 3 Drawing Figures

U.S. Patent  Apr. 3, 1979  Sheet 1 of 2  4,147,318
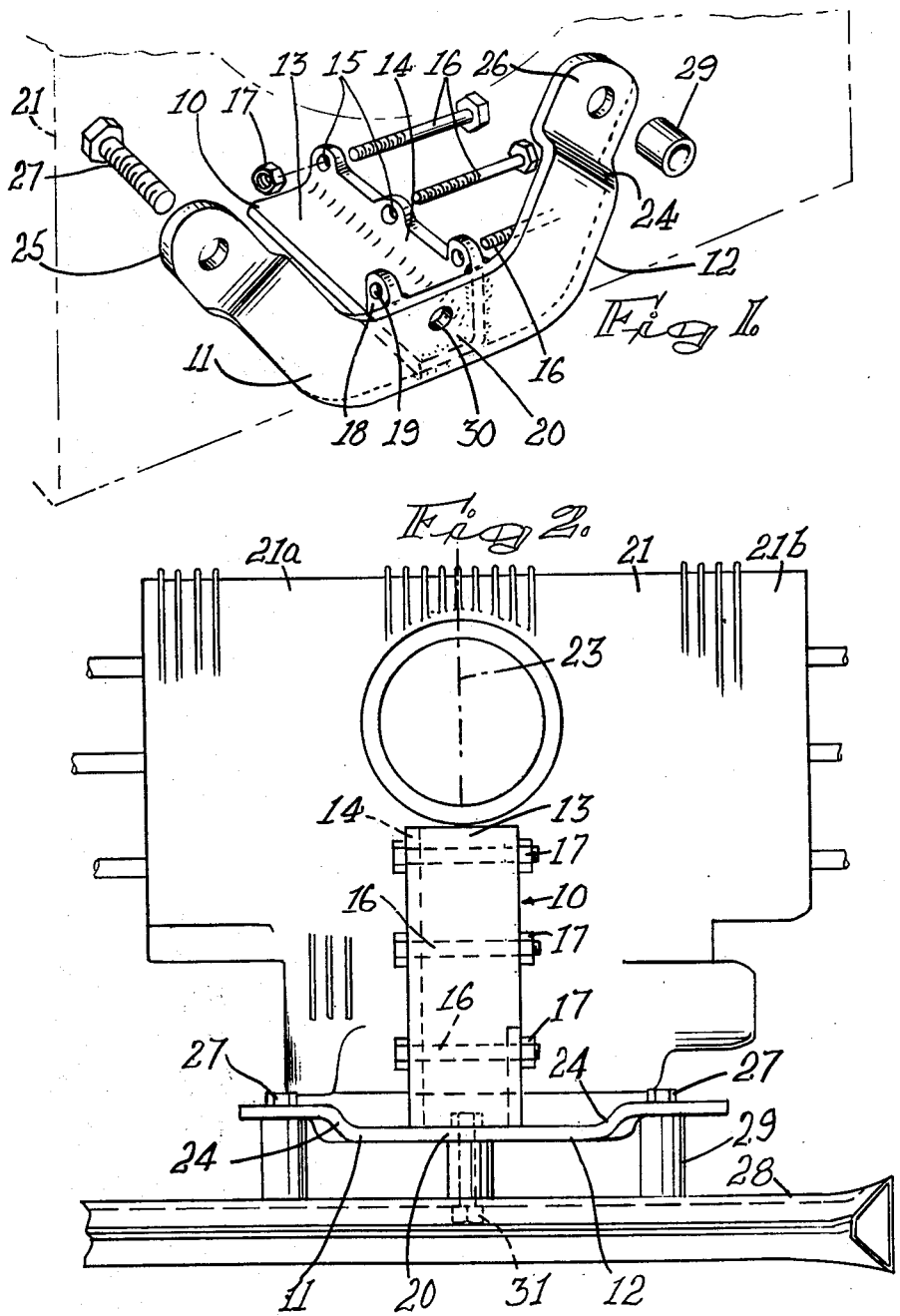

ENGINE CASING SUPPORT BRACKET

BACKGROUND OF THE INVENTION

This invention relates to a bracket for supporting engines on a chassis. In particular the invention is concerned with a support of an internal combustion engine on a motor vehicle chassis.

Difficulties arise with the support of engine casings on a chassis for motor vehicles. A particular problem arises where one wishes to support an internal combustion engine normally designed for one kind of vehicle on the chassis of a second kind of vehicle. The necessary adaption of the support means has to date presented considerable difficulty, and, none of the known means work effectively.

An example of one particular problem is the adaption of the support means for a Volkswagen (trade mark) engine normally used on "BEETLE" vehicles to an engine suitable for the conventional "COMBI" Volkswagen (trade mark) vehicle. The "BEETLE" engine is supported on the conventional "BEETLE" chassis in a fashion different from the support means for a "COMBI" engine. In other respects however, the casings for the engine are similar to each other.

The problems which have arisen in the past include weakness in the support bracket, deterioration of the engine casing itself due to an unsatisfactory support, and loosening of other components associated with the engine casing due to poor loading characteristics and support zones for the bracket and the casing thereon.

SUMMARY OF THE INVENTION

It is an object of this invention to provide a support bracket which will overcome or at least minimize problems experienced to date and will provide an effective means of supporting an internal combustion engine on a chassis.

According to the invention there is provided a bracket for facilitating the support of an internal combustion engine on a chassis wherein the bracket includes an arm to be affixed to the casing of the engine substantially centrally relative to the longitudinal line or longitudinal axis of the engine, and means to affix the bracket to the chassis.

Further according to the invention the bracket defines a zone for location substantially matingly with a part of the configuration of the base zone of the engine casing thereby to ensure stable location across the bracket and engine.

Also according to the invention the engine casing defines two half sections affixed together substantially along the central longitudinal line of the engine by stud means passing through mating apertures in the two half sections, a bracket being provided with threaded apertures in a position mating with the threaded apertures in the casing such that bolt means or the like can replace the stud means and thereby affix the arm to the casing.

In a preferred form of the invention the arm provides a wing extending transversely to either side of the arm, each wing being adapted to be affixed to a transverse bracket which is itself connected to the chassis. In some preferred forms of the invention wings also are affixed to the engine casing by bolt or the like means, and in other preferred forms of the invention the wings are free of the casing.

The wings are affixed to the casing and/or the transverse bracket through bolt means passing through apertures disposed towards the ends of the wings. In some forms of the invention the wings are provided with stepped zones thereby to engage matingly neatly and effectively with the engine casing.

In other forms of the invention the bracket is affixed with the casing by lateral bolt means and, in addition, longitudinal bolt means extending from the zone where the wings meet with the arms.

BRIEF DESCRIPTION OF THE DRAWINGS

The invention is now described with reference to the accompanying drawings which illustrate a preferred form of the invention, the drawings being:

FIG. 1 is a perspective exploded view of a bracket in accordance with the invention, an engine casing being shown in phantom lines relative to the bracket, FIG. 2 is a plan view from the under side of an engine casing illustrating the bracket in position and attached only to the transverse bracket, and, FIG. 3 is a part perspective view from below showing the bracket affixed to the under part of the casing of the engine.

DESCRIPTION OF THE PREFERRED EMBODIMENTS

Figure 3:
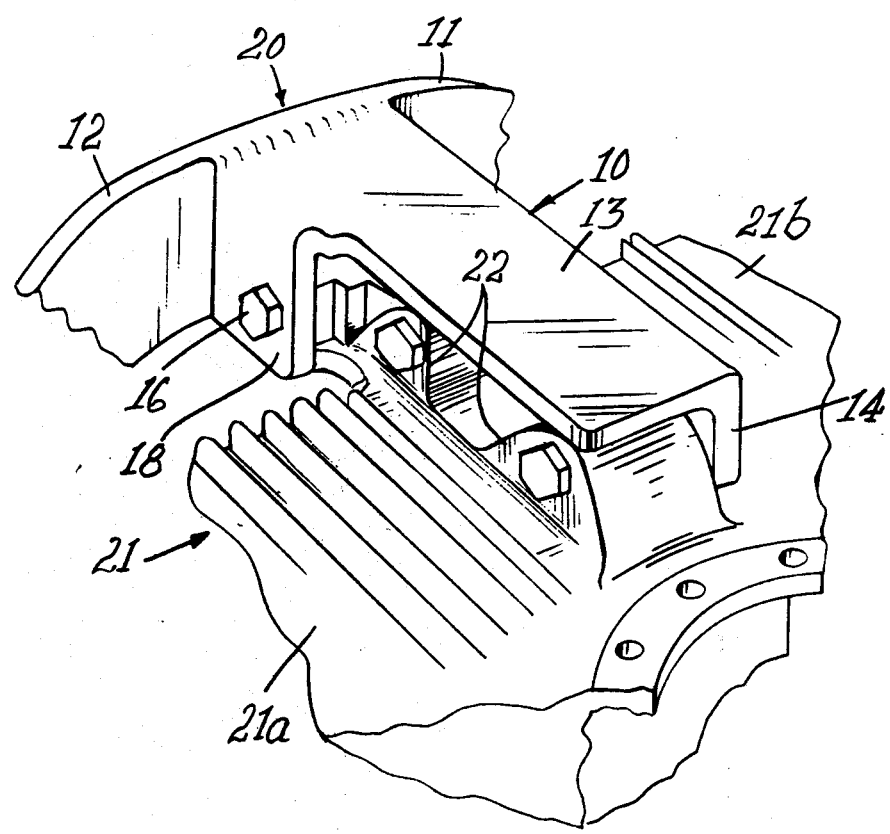

Referring now to the drawings, wherein like reference numerals designate identical or corresponding parts throughout the several views, and more particularly to FIG. 1 thereof, a bracket for facilitating the support of an internal combustion engine is constituted by an arm 10 and two wings 11 and 12. The arm 10 is itself defined by a base zone 13 and a side wall 14. In wall 14 there is provided three apertures 15 through which bolts 16 can pass. The bolts at their free end receiving nuts 17.

Opposite side wall 14 there is provided an additional short side wall 18 which provides an aperture 19 to receive the free end of the bolt 16 which is closest to wings 11 and 12. The portion 20 of wings 11 and 12 which is constituted between side walls 14 and 18 and base zone 13 constitutes substantially a cubic receiving zone into which a mating portion of the engine casing 21 can be rectangularly housed. The engine casing 21 itself provides two built up base zones 22 through which bolts 16 can pass. The base zone 13 mates neatly with the built up base zones 22 and this together with the cubic receiving section provides means for neatly and effectively engaging the support bracket with the base zone of the engine casing 21.

The built up zones 22 are constituted along a central line of the engine casing 21 which is itself constituted by two half sections 21a and 21b which mate along the central axis 23. Conventionally the half sections 21a and 21b are held together at least in part by stud means which pass through the apertures within the built up base zones 22. With this form of mounting the bracket is equilaterally disposed below the casing 21 and in this fashion lateral forces on the bracket are minimized.

Wings 11 and 12 are provided with stepped zones 24 and at the free ends 25 and 26 apertures are provided through which bolts 27 can pass. The free ends 25 and 26 are connected to a support bracket 28 and if necessary suitable spacer means 29 can be provided there between.

In the invention illustrated the free ends 25 and 26 of the bracket are shown connected only to the support bracket 28 and not to the engine casing 21. In some forms the free ends 25 and 26 could be adapted for direct connection through the bolt means 27 to the engine casing as well. Apertures are then provided in the engine casing at a suitably disposed point thereto. In the portion 20 of the wings as defined between side walls 14 and 18 there is provided a longitudinal aperture 30 into which a bolt 31 can pass, the bolt being located within a threaded zone inside the engine casing.

The support bracket of the invention will have useful advantages and will effectively support an engine casing 21 without the disadvantages of currently known support means.

Obviously, numerous additional modifications and variations of the present invention are possible in light of the above teachings. It is therefore to be understood that within the scope of the appended claims, the invention may be practiced otherwise than as specifically described herein.

I claim:

1. A bracket for facilitating the support for an internal combustion engine on a chassis wherein the bracket includes a main part and an arm projecting therefrom; a wing extending transversely to either side of the arm, each wing being adapted to be affixed to a transverse bracket which is itself connected to the chassis; the arm adapted to be affixed to the casing of the engine substantially centrally relative to the longitudinal axis of the engine, and means to affix the main part of the bracket to the chassis; wherein the engine casing has a base zone and the arm defines a zone for location substantially matingly with a part of the configuration of the base zone on the engine casing thereby to ensure stable location across the bracket and engine; and wherein the engine casing defines two half sections fixed together substantially along the longitudinal axis of the engine by stud means passing through threaded mating apertures in the two half sections, the arm of the bracket being provided with threaded apertures in a position mating with the threaded apertures in the casing such that bolt means can replace the stud means and thereby affix the arm to the casing.

2. A bracket as claimed in claim 1 wherein the wings are fixed to the engine casing by bolt-like means.

3. A bracket as claimed in claim 2 wherein the wings are affixed to the casing.

4. A bracket as defined in claim 2 wherein the wings are affixed to the transverse bracket through bolt means passing through the apertures disposed towards the ends of the wings.

5. A bracket as claimed in claim 1 wherein the wings are free of the casing.

6. A bracket as claimed in claim 1 wherein the wings are provided with stepped zones thereby to engage matingly neatly and effectively with the engine casing.

7. A bracket as claimed in claim 1 wherein the wings are affixed to the casing and the transverse bracket through bolt means passing through the apertures disposed towards the ends of the wings.

8. A bracket as claimed in claim 1 wherein bolt means transversely disposed relative to the longitudinal axis of the casing and bolt means longitudinally disposed relative to the casing permit affixation of the arm to the casing.

9. A bracket for supporting an internal combustion engine on a chassis wherein the bracket includes an arm to be affixed to the casing of an engine such casing being defined by two half sections, the sections being affixed together by bolt-like means passing through apertures in the engine casing substantially along the longitudinal line defined between the front and back of the engine, the arm providing apertures to mate with the apertures in the casing and the arm being affixed to the casing by bolt means passing through such apertures and the mating apertures in the two half sections, the arm providing at its one end a wing extending transversely to either side of the arm, each wing being adapted to being affixed to a transverse bracket connected to the chassis.

10. A bracket as claimed in claim 9 wherein the wings are free of the casing.

11. A bracket as claimed in claim 10 wherein bolt means transversely disposed relative to the longitudinal axis of the casing and bolt means longitudinally disposed relative to the longitudinal axis of the casing permit affixation of the arm to the casing.

* * * * *